United States Patent

Bonewitz et al.

[11] Patent Number: 5,917,602
[45] Date of Patent: Jun. 29, 1999

[54] SYSTEM AND METHOD FOR IMAGE ACQUISITION FOR INSPECTION OF ARTICLES ON A MOVING CONVEYOR

[75] Inventors: Manuel Bonewitz; Bozidar Kosta, both of Clearwater, Fla.

[73] Assignee: Inex Inc., Clearwater, Fla.

[21] Appl. No.: 09/070,266

[22] Filed: Apr. 30, 1998

[51] Int. Cl.[6] .................................................. G01B 11/24
[52] U.S. Cl. ............................ 356/376; 348/127; 250/223
[58] Field of Search ............................ 356/376; 348/127; 250/223 R, 224, 231.14

[56] References Cited

U.S. PATENT DOCUMENTS

| | | | |
|---|---|---|---|
| 4,064,534 | 12/1977 | Chen et al. | 358/107 |
| 4,074,938 | 2/1978 | Taylor | 356/160 |
| 4,082,463 | 4/1978 | Dehait et al. | 356/167 |
| 4,097,158 | 6/1978 | Dehait | 356/160 |
| 4,476,533 | 10/1984 | Daudt et al. | 364/473 |
| 4,553,217 | 11/1985 | Daudt et al. | 364/560 |
| 4,664,521 | 5/1987 | Scott et al. | 356/240 |
| 4,679,075 | 7/1987 | Williams et al. | 358/106 |
| 4,694,158 | 9/1987 | Leser | 250/223 B |
| 4,874,940 | 10/1989 | McMeekin et al. | 250/223 B |
| 4,906,098 | 3/1990 | Thomas et al. | 356/376 |
| 4,930,364 | 6/1990 | Baker et al. | 73/865.8 |
| 5,383,021 | 1/1995 | Hanna | 356/365 |
| 5,675,516 | 10/1997 | Bone et al. | 364/562 |
| 5,699,161 | 12/1997 | Woodworth | 356/373 |

FOREIGN PATENT DOCUMENTS

| | | | |
|---|---|---|---|
| 2 087 549 A | 11/1980 | United Kingdom | G01N 21/90 |

*Primary Examiner*—Frank G. Font
*Assistant Examiner*—Reginald A. Ratliff
*Attorney, Agent, or Firm*—Senniger, Powers, Leavitt & Roedel

[57] ABSTRACT

A system and method for inspecting a moving container on a conveyor. An encoder assembly detects movement of the conveyor and generates a signal representative of the speed of the container as a function of the movement of the conveyor. A light source adjacent the conveyor illuminates the container and a camera adjacent the conveyor generates a plurality of successive images of portions of the illuminated container. The images each include a plurality of pixels, each having a value representative of an optical characteristic of the images. The camera is controlled to generate the successive images as a function of the speed of the moving container. An image processor acquires a two-dimensional image of the container from the successive images generated by the camera and processes the two-dimensional image as a function of the pixel values to detect edges in the image for inspecting the container.

29 Claims, 6 Drawing Sheets

SYSTEM AND METHOD FOR IMAGE ACQUISITION FOR INSPECTION OF ARTICLES ON A MOVING CONVEYOR

BACKGROUND OF THE INVENTION

The invention relates generally to inspection systems and, particularly, to a system for acquiring images of articles, such as glass containers, on a moving conveyor for use in inspecting the articles.

Container molding machines, referred to in the industry as individual section (IS) machines, are used to form containers, such as glass bottles and jars. Typically, an IS machine has a number of sections, each section having multiple cavities or molds, in which molten glass is formed into the desired container shape. After forming, a conveyor or the like moves the containers through a lehr which anneals the glass by subjecting the containers to stress-relieving temperatures. During the forming and annealing process, various defects (e.g., improper annealing, embedded foreign objects, variations in glass density, or other anomalies) may occur. An accurate and reliable inspection system is needed for identifying containers with defects and for inspecting the containers' profiles.

Further, many of these defects may be corrected during the manufacturing process to minimize the number of defective containers formed by the molding machine. Therefore, such an inspection system which provides feedback to the container molding machine and/or the lehr is desired to correct defects in subsequently formed containers.

Conventional inspection systems include line scan cameras for generating one-dimensional images of a container as it moves past the cameras. In other words, the cameras capture line images. Unfortunately, such cameras operate at a fixed speed and, thus, the line images are affected by the speed of the container. In other words, the images appear compressed or expanding depending on the container's speed. Further, the images of the container are processed line-by-line.

For these reasons, an inspection system which operates as a function of container speed to prevent imaging errors and which acquires two-dimensional images for processing to detect defects or obtain a container profile is desired.

SUMMARY OF THE INVENTION

The invention meets the above needs and overcomes the deficiencies of the prior art by providing an accurate, reliable and adaptable system for inspecting articles on a moving conveyor. This is accomplished by an improved inspection system which acquires two-dimensional images of the articles under inspection with a line scan camera. Advantageously, such an inspection station provides images with improved resolution and contrast by controlling the speed and exposure of the camera as a function of the speed of the articles. An improved encoder according to the invention provides accurate speed signals for use by the system. In addition, the system is easily implemented, economically feasible and commercially practical.

Among the several objects of this invention may be noted the provision of a system and method for inspecting a molded container which overcomes the disadvantageous conditions described above; the provision of such system and method which permits use with an automated inspection system; the provision of such system and method which permits use with an automated container handling apparatus; the provision of such system and method which permits detection of stress-related defects in the container; and the provision of such system and method which is economically feasible and commercially practical.

Briefly described, a system for inspecting a moving container embodying aspects of the invention includes a speed monitor for generating a signal representative of the speed of the container. A light source illuminates the container and a camera generates a plurality of successive images of portions of the illuminated container. The images each include a plurality of pixels, each having a value representative of an optical characteristic of the images. The system also includes an electronic control receiving and responsive to the speed signal for controlling the camera to generate the successive images as a function of the speed of the moving container. The electronic control has an image processor for acquiring a two-dimensional image of the container from the successive images generated by the camera and for processing the two-dimensional image as a function of the pixel values to detect edges in the image for inspecting the container.

Another embodiment of the invention is directed to an encoder for use with a container handling apparatus for moving containers. The container handling apparatus includes a conveyor having a moving belt and the encoder generates a signal representative of the speed of the conveyor belt. The encoder includes a pair of pulleys which receive a tracking belt. The tracking belt extends across the pulleys and engages the conveyor belt so that movement of the conveyor belt causes a corresponding movement of the tracking belt. The encoder also includes circuitry for generating the signal representative of the speed of the conveyor belt as a function of the movement of the tracking belt.

A system for inspecting a moving container on a conveyor also embodies aspects of the invention. The system includes an encoder for detecting movement of the conveyor's belt and generating a signal representative of the speed of the container as a function of the movement of the conveyor belt. A light source adjacent the conveyor illuminates the container and a camera adjacent the conveyor generates a plurality of successive images of portions of the illuminated container. The images each include a plurality of pixels, each having a value representative of an optical characteristic of the images. The system also includes an electronic control receiving and responsive to the speed signal for controlling the camera to generate the successive images as a function of the speed of the moving container. The electronic control has an image processor for acquiring a two-dimensional image of the container from the successive images generated by the camera and for processing the two-dimensional image as a function of the pixel values to detect edges in the image for inspecting the container.

Another embodiment of the invention is directed to a method of inspecting a moving container on a conveyor which has a belt for moving the container. The method includes the steps of positioning an encoder on the conveyor belt for detecting movement thereof and generating a signal with the encoder representative of the speed of the container as a function of the movement of the conveyor belt. The method also includes illuminating the container on the conveyor belt and controlling a camera to generate a plurality of successive images of portions of the illuminated container as a function of the speed of the moving container. The images each include a plurality of pixels, each having a value representative of an optical characteristic of the images. The method further includes the steps of acquiring a two-dimensional image of the container from the successive images generated by the camera processing the two-dimensional image as a function of the pixel values to detect edges in the image for inspecting the container.

Other objects and features will be in part apparent and in part pointed out hereinafter.

BRIEF DESCRIPTION OF THE DRAWINGS

Corresponding reference characters indicate corresponding parts through the drawings.

DETAILED DESCRIPTION OF PREFERRED EMBODIMENTS

Figure 1:
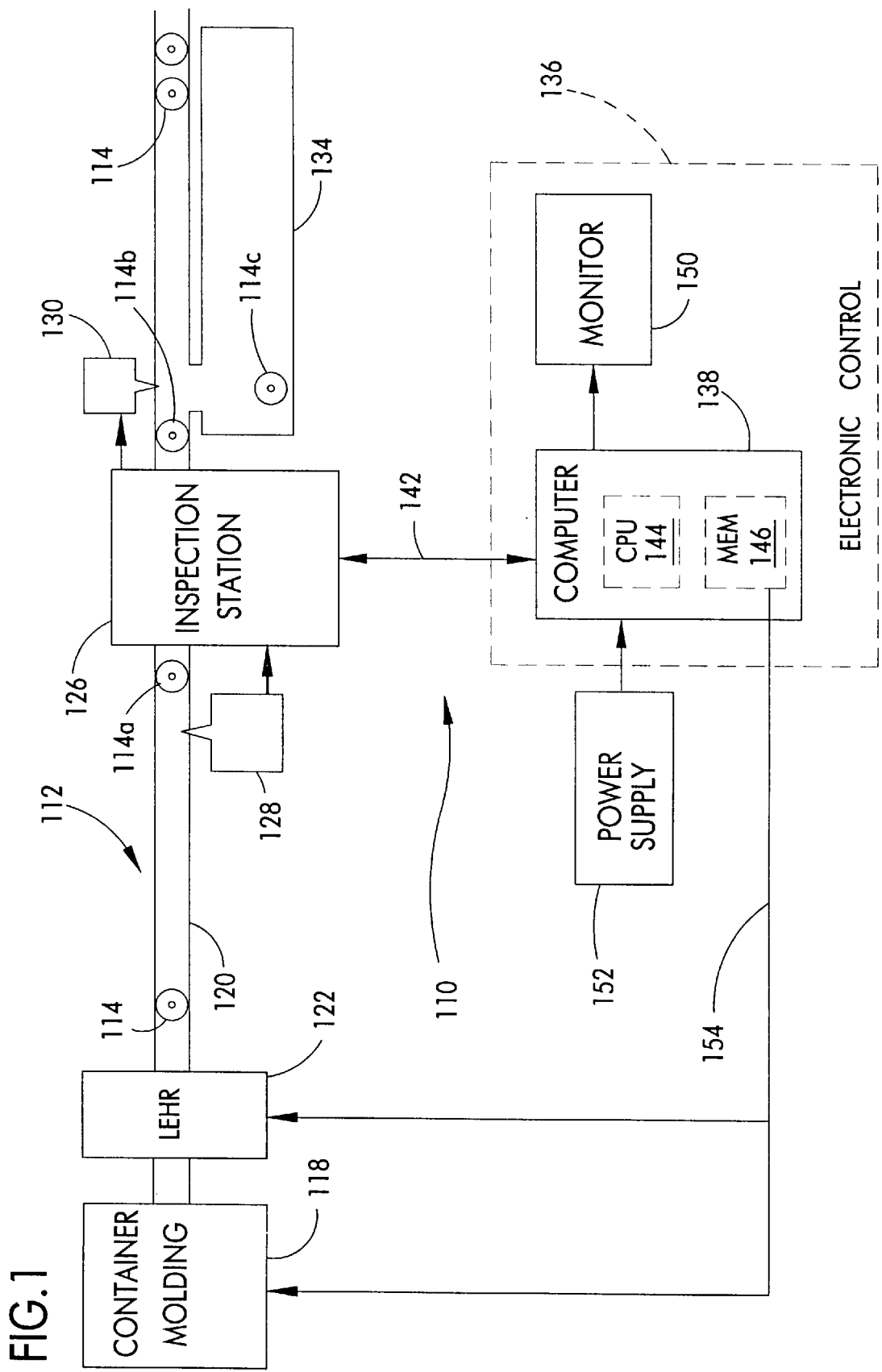
FIG. 1 is a block diagram of a system for inspecting containers according to a preferred embodiment of the invention in combination with a container handling apparatus transporting containers from a container molding apparatus to the system.

Referring now to the drawings, FIG. 1 illustrates an image acquisition system, generally indicated at reference character 110, embodying aspects of the present invention. It is contemplated that the system 110 may be used to image any article such as a container or other article of manufacture. In one preferred embodiment, system 110 is for use with a container handling apparatus, indicated generally at 112, which handles a plurality of containers 114, each formed by a container molding apparatus 118. As an example, the container molding apparatus 118 is an individual section (IS) machine. As is known in the art, IS machines have a number of sections, each section having multiple cavities or molds, in which molten glass is formed into the desired container shape (e.g., glass bottles and jars).

For glass container production, a conveyor 120 transports containers 114 from molding apparatus 118 to a lehr 122. The lehr 122 anneals the glass by subjecting containers 114 to stress-relieving temperatures. The forming and annealing stages of glass manufacture are often referred to in the industry as the hot end. An infeed conveyor portion of the conveyor 120 then delivers containers 114 to an inspection station 126. As described above, container molding apparatus 118 has a plurality of individual sections (e.g., sixteen sections) and each section has a plurality of molds (e.g., four molds). Such apparatus 118 is capable of producing containers 114 at a relatively high rate of speed (e.g., several hundred containers per minute). Preferably, the speed of conveyer 120 is set to accommodate the relatively high rate of speed at which molding apparatus 118 produces containers 114. The inspection station 126 is also synchronized to this speed. Conveyer 120 may be any standard container mover known to those skilled in the art, such as a horizontal belt conveyer or a channel through which containers 114 are pushed.

Before containers 114 enter inspection station 126, a container separator 128 preferably spaces them apart at regular intervals to facilitate the inspection process. For example, a finger wheel or star wheel apparatus having a plurality of fingers for engaging and separating containers 114 as they feed into inspection station 126 via the infeed conveyor portion constitutes a suitable container separator 128. In this manner, container separator 128 ensures that containers 114 will be relatively evenly spaced. Preferably, the fingers are adjustable to accommodate containers 114 of different size. A container 114a is shown on the infeed conveyor portion of conveyor 120.

In a preferred embodiment, the inspection station 126 of system 110 provides high speed image acquisition for use in inspecting containers 114 on the moving conveyor 120. In this instance, the acquired image may be used for inspecting the profile of each container 114 and/or for detecting defects. Although system 110 is described herein with respect to container 114 (i.e., a molded glass bottle), system 110 advantageously performs image acquisition for different articles of manufacture made from a variety of materials such as glass, plastic, metal or ceramic, and made by a variety of processes.

As used herein, the term "profile" refers to a dimensional representation of an article as viewed from a side, i.e., the external dimensions of the article and the spatial relationship between the dimensions of the portions of the article. For example, a profile of a bottle having a neck tapering into a cylindrical body would include the various diameters of the neck and body and the height of the neck, taper and body. These measurements may be taken from various side perspectives of the bottle in relation to a (vertical) first reference to determine its ovality as well. The lean of the bottle is the inclination of the bottle away from the vertical when the bottle is supported in a substantially vertical position on a substantially horizontal surface. The lean of the bottle defines the spatial relationship between the neck, taper and body as compared to a vertical reference and is part of the profile. The tilt of the bottle defines the spatial relationship between the top and bottom surfaces of the bottle, i.e., between the sealing surface and the heel, and can be determined by measuring the height of the bottle as viewed from various side perspectives.

After inspection, containers 114 exit via an outfeed conveyor portion of conveyor 120 on which a container 114b is shown. If any of containers 114 are found to be defective, a rejector 130 removes them from the outfeed conveyor portion of conveyor 120. The rejector 130 preferably comprises an air jet or mechanical ram which pushes the defective containers, such as a container 114c, from conveyor 120 to a reject accumulation conveyor 134 connected to the outfeed conveyor portion. The reject accumulation conveyor 134 then collects each rejected container 114c for later disposal.

As shown in FIG. 1, containers 114 travel directly through inspection station 126 on conveyor 120. In other words, system 110 has an in-line configuration. It is contemplated, however, that system 110 may include suitable container handling apparatus for selectively bypassing inspection station 126. Generally, all containers 114 are routed to inspection station 126 for inspection by system 110. However, it may be necessary on occasion to bypass system 110 to prepare for job changes or to perform other tasks such as routine maintenance. Thus, system 110 may include a diverting gate (not shown) for selectively diverting containers 114 from conveyor 120 to another conveyor.

Referring further to FIG. 1, system 110 also includes an electronic control 136. In the illustrated embodiment, the electronic control 136 has a computer 138 which communicates with inspection station 126 via line 142 (e.g., interface cables). As an example, the computer 138 has a central processing unit 144 comprising of a Texas Instruments' image processor, a RISC processor programmed to perform image analysis, or like processor, and a memory 146, as well as the other circuits, for performing the image acquisition and processing tasks. In this embodiment, system 110 employs visual imaging techniques which extract information regarding variations in shading to detect the presence of production defects, contamination and/or damage (e.g., blisters, improper annealing, embedded foreign objects and variations in glass density).

A monitor 150 displays information regarding the inspection and a power supply 152 provides power to each component of system 110. Image acquisition system 110 also communicates with lehr 122 and/or container molding apparatus 118 via a feedback line 154. If a consistent failure or undesirable trend exists, electronic control 136 informs the automated control of container molding apparatus 118 or lehr 122 (or their operators) to either correct the problem or shut down the molding process to diagnose the problem more fully. Likewise, computer 138 preferably executes a series of diagnostic routines stored in its memory 146 to determine the cause of the detected defects and prescribe corrective actions to prevent the defects from recurring in containers 114 subsequently produced by molding apparatus 118.

Figure 2:
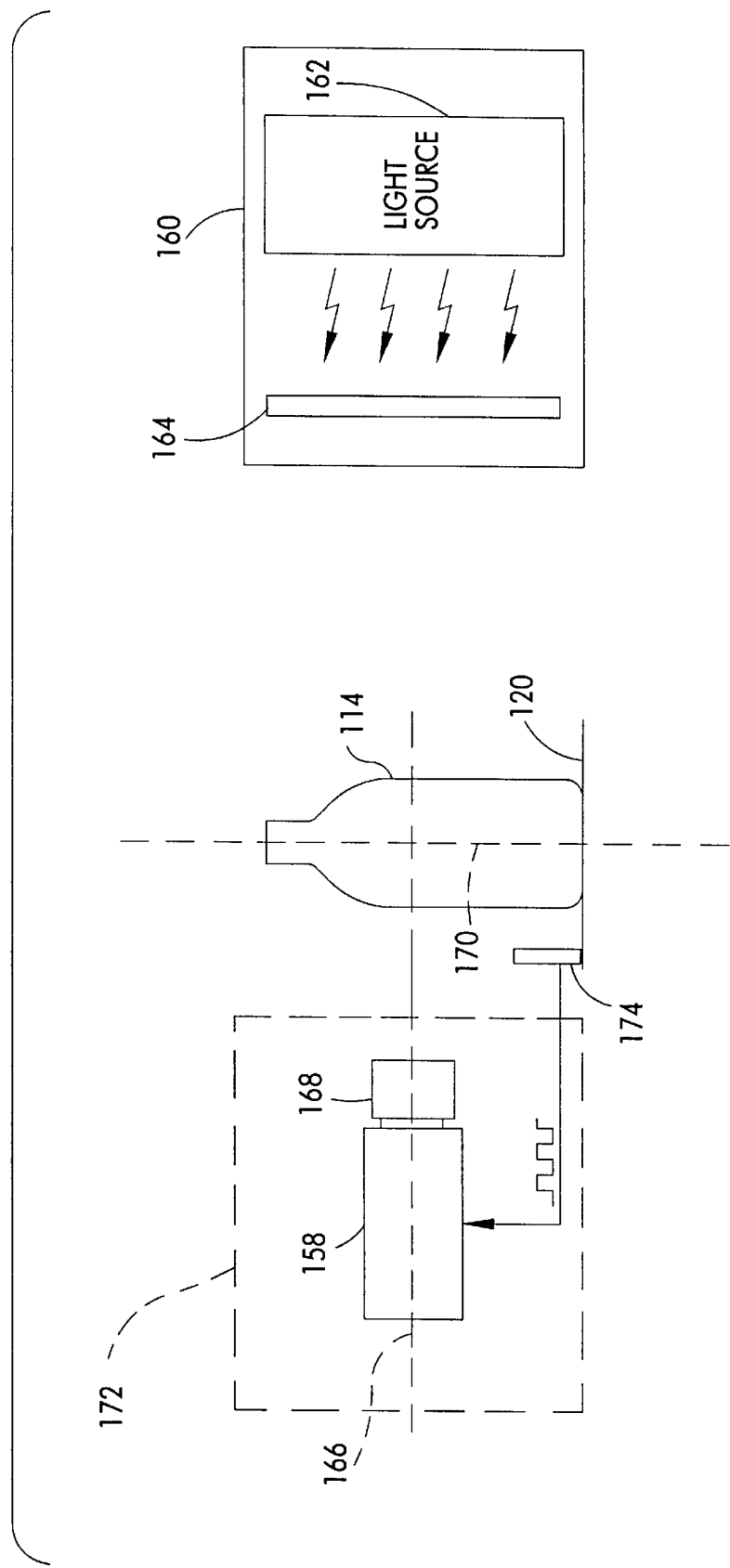
FIG. 2 is a diagrammatic view of a preferred test configuration for the system of FIG. 1.

FIG. 2 provides a diagram illustrating the interior of inspection station 126. As shown, a preferred electronic/optical imaging configuration for image acquisition includes a camera 158 and a lighting assembly 160 positioned across conveyor 120 opposite the camera 158 to define an imaging area in the path of conveyor 120. The lighting assembly 160 illuminates containers 114 as conveyor 120 moves them through the imaging area in the optical path of camera 158. Preferably, lighting assembly 160 has a fluorescent light source 162 which provides relatively constant and even illumination of container 114. Depending on whether dimensional or defect imaging is desired, lighting assembly 160 may include one or more optical layers 164 for altering the characteristics of the light. For example, a diffuser mask focuses the illumination in a smaller area and/or a layer of diffusion material more evenly distributes the light over the inspection area. In addition, a light control filter may be used to reduce glare. Preferably, lighting assembly 160 illuminates container 114 with more diffuse light when detecting defects so that the defects will appear dark in the acquired image and illuminates container 114 with less diffuse, more direct light when inspecting the profile to cause higher contrast edges in the acquired image. As shown in FIG. 2, camera 158 has an optical axis 166 defined by its lens 168. The optical axis 166 intersects with an axis of symmetry 170 of container 114 as conveyor 120 moves container 114 through inspection station 126.

In a preferred embodiment, camera 158 is a high resolution line scan camera, such as the charge-coupled device (CCD) line scan camera manufactured by DALSA as model number CL-CB 1024A. Camera 158 generates a plurality of line images of the side wall of container 114 as it passes in between lighting assembly 160 and camera 158. In particular, camera 158 scans container 114 as it moves past it to generate an image made up of a single column of pixels. System 110 acquires a plurality of these columns, or line scan elements, to form a two-dimensional image of container 114 in its frame grabber (i.e., the image processing circuitry of computer 138) and utilizes visual imaging and computer analysis techniques to inspect empty containers 114 to detect the presence of production defects, contamination and/or damage or to inspect the container's profile. It is contemplated that camera 158 may be mounted in a camera box 172 having a window through which camera 158 views container 114.

With respect to the inspection process, camera 158 preferably consists of an array of light sensors known as charge-coupled devices. The output of the sensors form an image with respect to the spatial location of these sensors relative to each other. Generally, spatial sampling of the sensors is analogous to superimposing a grid on the imaged portion of container 114 and examining the energy output from each grid box. Each spatial location in the image (or grid) is known as a picture element, or pixel. In this instance, the image is made up of a plurality of line scan elements, each having a width of one pixel and a length (top to bottom) of a plurality of pixels (e.g., 1024).

Although container 114 is shown in a vertical or upright orientation, it is to be understood that this orientation is merely illustrative. System 110 inspects containers 114 without regard to their orientation so long as the relationship between camera 158 and the side wall portions of containers 114 is generally the same. Further, it is also contemplated that camera 158 may be positioned to receive reflected light rather than being in-line as shown in FIG. 2.

Referring further to FIG. 2, a rotary encoder 174 mounted on conveyor 120 generates a feedback signal indicating the speed of container 114 as it moves past camera 158. Electronic control 136 then determines an operating speed for camera 158 based on the feedback. In a preferred embodiment, the feedback signal is a series of pulses, or a pulse train, representing the movement of conveyor 120. In turn, this indicates the speed of container 114 as it travels through inspection station 126. System 110 preferably sets the encoder 174 to generate a predetermined number of pulses per inch of conveyor travel. The amount or number of pulses per product (e.g., each container 114) is based on the aspect ratio and the image buffer size (e.g., 1024×512 pixels) of memory 146. For example, if the image buffer has a width of 512 pixels, a preferred number of pulses per product is 502 (at one pulse per pixel) which allows 10 pixels of clear area to make dimensional measurements if necessary. The frequency (i.e., time) interval between pulses is based on the maximum speed of conveyor 120. This value determines the maximum clock speed of camera 158 to clock all pixels from the line scan element. Preferably, camera 158 may be clocked at speeds up to about 15 MHz.

As an example, conveyor 120 travels at a relatively high speed for running about 480 products per minute. If container 114 is five inches wide with a 25% gap between products, conveyor 120 has a speed of approximately 3000 inches per minute (50 inches per second). Assuming an image of container 114 which is 502 pixels wide, then each line scan element corresponds to about 0.01 inch of container 114 (100.4 pixels per inch). Thus, system 110 has a scanning interval of approximately 200 µs for each single pixel width line scan element. According to the invention, system 110 sets the clock rate of camera 158 to accommodate the scanning interval. If clocked at 5 MHz, camera 158 is able to clock out all pixels in a 1024 pixel line scan element in approximately 210 µs (including overhead).

Accordingly, system 110 increases the clock speed of camera 158 as the speed of conveyor 120 increases. When the speed of conveyor 120 is varying, the electronic control 136 of system 110 preferably provides a signal for controlling the exposure of camera 158. This signal keeps the light gathering capability of camera 158 substantially constant with respect to a varying conveyor pulse time by increasing the exposure as the camera speed increases. In other words, the light exposure of camera 158 is proportional to its speed.

The camera 158 continually outputs video data in a digital or an analog format during inspection. If the data is in an analog format, computer 138 advantageously performs analog-to-digital conversion as shown in the data flow diagram of FIG. 3. As shown, a flash analog-to-digital converter 178 transforms the analog voltage to a digital value whereby a number, or pixel value, is assigned as a function of the amount of energy observed at each spatial location of the sensor array of each camera. Computer 138 assigns pixel values to the electrical signals from camera 158 to form a matrix of numbers, i.e., a digital representation of the image. For example, camera 158 resolves each image of container 114 into an array of 1024×512 pixels (i.e., 512 single pixel width line scan elements of 1024 pixels each). For each pixel, camera 158 produces an analog voltage signal which computer 138 converts to an 8-bit or longer digital value. In the alternative, if camera 158 produces a digital value, the flash A/D is omitted from the data flow diagram of FIG. 3 although some logic and level translation may be performed.

The process of sampling the output of the sensor array of camera 158 in a particular order is known as scanning. As container handling apparatus 112 moves container 114 through inspection station 126, camera 158 and computer 138 cooperate to capture an image of container 114. The digital values of the captured image are loaded into the memory 146 of computer 138 (e.g., a tri-port VRAM) for use by its CPU 144 and/or hardware processing logic.

In a preferred embodiment, memory 146 stores the line scan images generated by camera 158 as arrays of 1024×512 pixels having 256 gray levels. In other words, system 110 acquires two-dimensional images of containers 114 for processing. Computer 138 then analyzes the gray level changes of the images stored in memory 146 to detect the presence of defects and/or to measure the container profiles. Computer 138 preferably defines window regions or areas of interest. With respect to the shape of the regions, it is to be understood that they may be of various shapes depending on the desired region to be examined. Thus, computer 138 constitutes an image processor for detecting an optical characteristic of the image within a defined region of the image.

Figure 4:
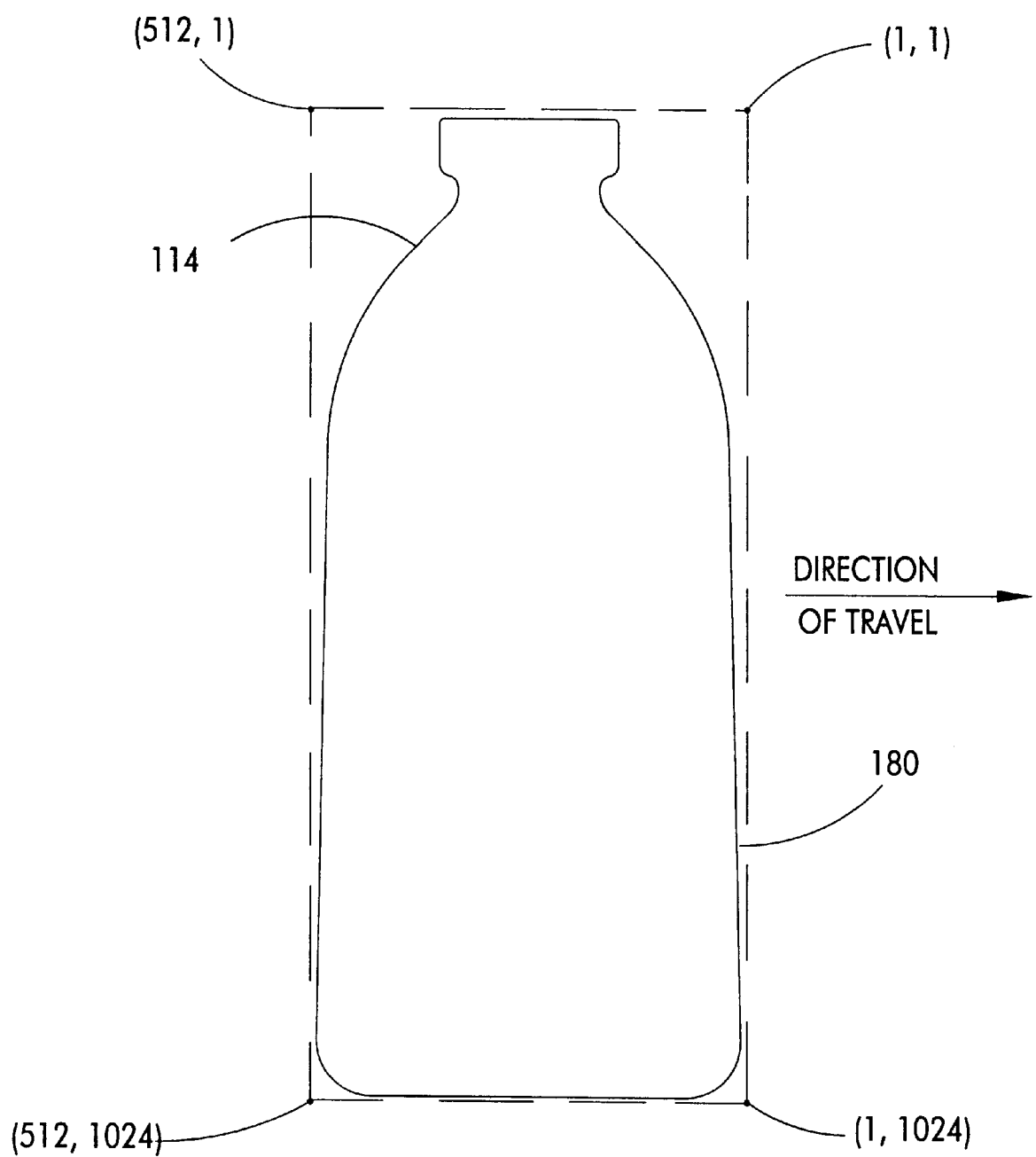
FIG. 4 is an exemplary illustration of a two-dimensional image acquired by the system of FIG. 1.

FIG. 4 illustrates an example of a two-dimensional image of container 114. The image is shown with respect to an image buffer of 1024×512 pixels. For simplicity, a rectangular coordinate system defines a first pixel at point (1,1) in the upper righthand corner and a last pixel at point (512, 1024) in the lower lefthand corner. This image begins at a leading edge 180 and is made up of approximate 502 line scan elements (right to left).

Figure 5:
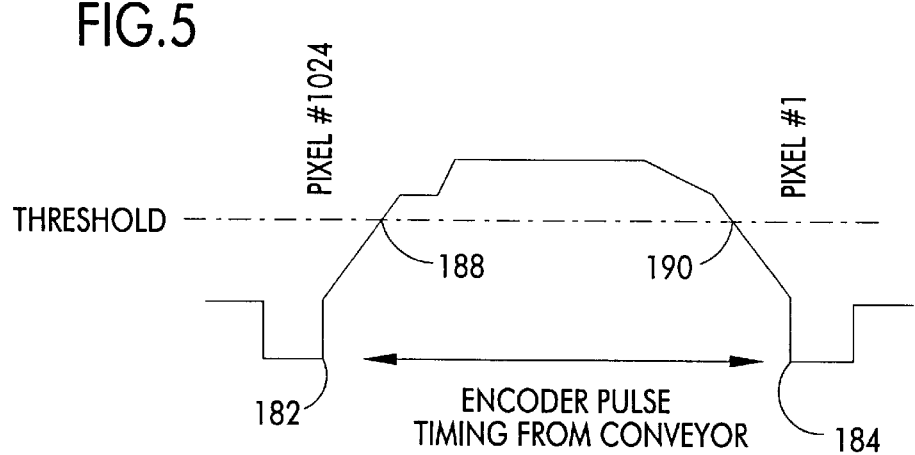
FIG. 5 is an exemplary illustration of video signal levels for a line scan element acquired by the system of FIG. 1.

Referring now to FIG. 5, system 110 specifies a pixel range and sets a threshold value to detect when container 114 is in the field of view of camera 158. In other words, the leading edge 180 of container 114 is expected to be found between an upper pixel and a lower pixel. Further, the pixel values for the pixels in this line scan element are disregarded if they are below the threshold value. FIG. 5 illustrates an exemplary portion of the video signal for detecting the leading edge of container 114. Camera 158 generates a line scan element as container 114 comes into view. In this instance, camera 158 is synchronized to the pulse train provided by encoder 174. As such, camera 158 scans the entire line scan element, from the bottom pixel (i.e., #1024) to the top pixel (i.e., #1) during one of the pulses. As shown in FIG. 5, the points on the video signal marking the beginning and ending of the corresponding pulse are indicated 182 and 184, respectively. At reference character 188, the video signal exceeds the threshold value and then falls below it at reference character 190. Preferably, electronic control 136 considers the pixel values to be valid indications of the leading edge 180 of container 114 if they both exceed the threshold value and fall between an upper pixel limit and a lower pixel limit. If desired, electronic control 136 can also apply the upper and lower pixel limits as well as the threshold value to line scan elements other than the leading edge.

In this manner, system 110 reduces the possibility of a false detection of the presence of container 114 in the view of camera 158. Once container 114 is detected, electronic control 136 can specify the number of scans to acquire for generating a two-dimensional image of the container 114 under inspection. In the previous example, if container 114 is five inches wide, a preferred number of line scan elements per product is 502. As before, the amount of memory and the inspection requirements define limits on scans and resolution. Inspection station 126 of system 110 provides high speed image acquisition for use in inspecting containers 114 on the moving conveyor 120. The acquired two-dimensional image may be used for inspecting the profile of each container 114 as well as for inspecting containers 114 for various defects and other characteristics.

Commonly assigned application Ser. No. 08/868,715, the entire disclosure of which is incorporated herein by reference, discloses an exemplary two-dimensional image analysis process. As described above, camera 158 generates an image comprising a plurality of pixels, each pixel having a value representative of a detected optical characteristic of the image. In this instance, the pixel values correspond to the intensity of the pixels as represented by their gray levels. Computer 138 first determines if an image is stored in its memory 146 and then registers the image. In other words, computer 138 locates container 114 in the image. In general, registration is used to locate container 114 in the memory array stored in memory 146 for use in inspecting the container. For example, registration lines on an image are used to detect a side wall portion of container 114. Computer 138 scans the pixels of the image along the registration lines and performs convolution or another edge operator to detect edges of container 114. Preferably, the registration, or scan, lines are directional (e.g., scanning from top to bottom or vice versa).

In the vision system arts, edges are defined as regions in the image where there is a relatively large change in gray level over a relatively small spatial region. According to the invention, computer 138 performs several routines for analyzing the image, including edge detection routines which analyze the gray level changes in defined window regions for detecting the container's profile. Various edge detection operators, or algorithms, for finding and counting edges in an image are known to those skilled in the art. For example, suitable edge detection routines include Sobel or Prewit algorithms. In turn, computer 138 determines the height, width, lean and other parameters of container 114.

Figure 3:
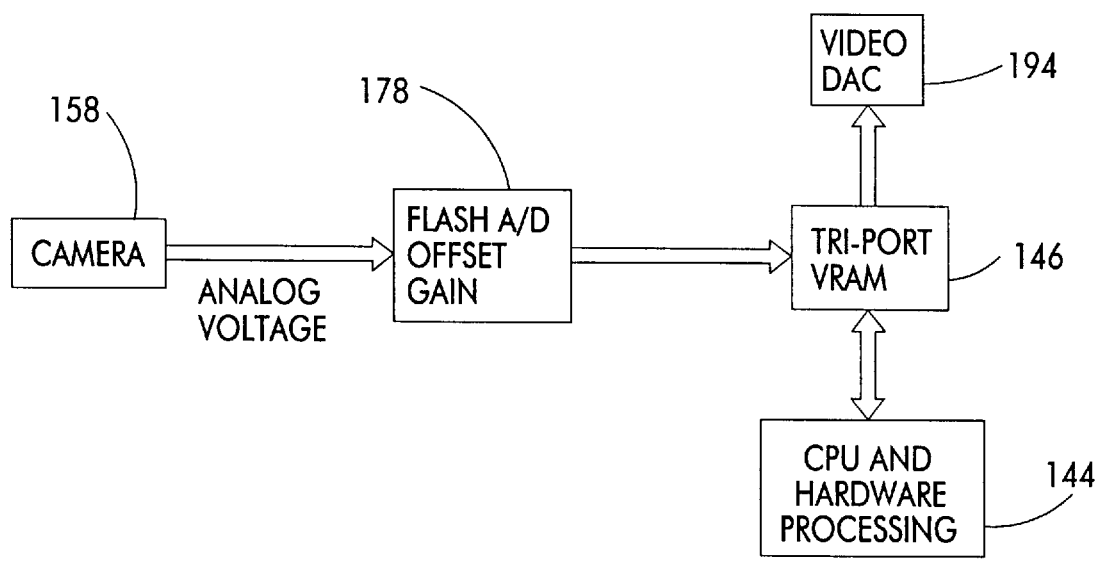
FIG. 3 is a block diagram illustrating data flow within the system of FIG. 1.

As shown in FIG. 3, a video digital-to-analog converter 194 of electronic control 136 has access to the stored data for displaying the image on monitor 150. Advantageously, an overlay may also be displayed on monitor 150 to highlight regions of interest or defects in the image.

Figure 6:
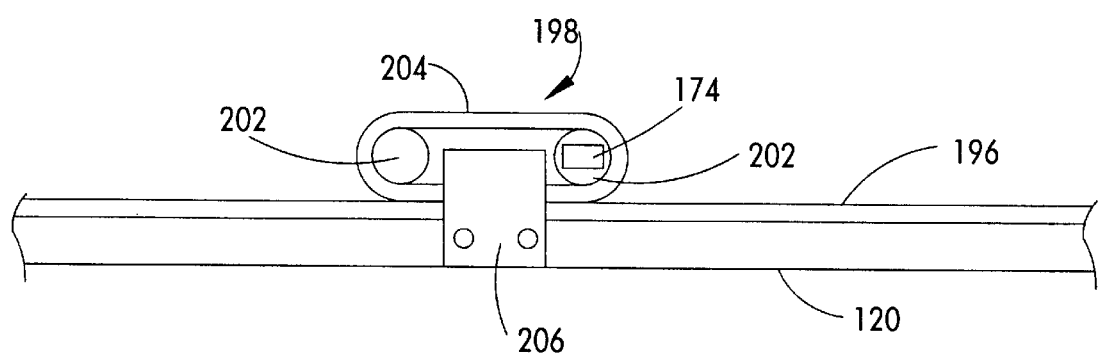
FIG. 6 is a side view of an encoder for use with the system of FIG. 1.

Referring now to FIG. 6, conveyor 120 has a moving chain or belt 196 on which containers 114 rest. As the conveyor belt 196 moves, so do containers 114. A preferred embodiment of encoder 174 uses a belt and pulley mounting arrangement indicated generally at reference character 198. According to the invention, the belt and pulley mounting arrangement 198 has a pair of pulleys 202 receiving a tracking belt 204 extending therebetween. The tracking belt 204 rests on the top surface of conveyor belt 196 and engages it by friction. The material from which tracking belt 204 is made depends on the environment as well as the surface of conveyor belt 196.

In this embodiment, encoder 174 has a rotatable member known in the art which engages one of the pulleys 202 and moves in concert with the pulley 202. For example, Heidenhain manufactures a suitable encoder 174 under its model number ROD539.1A23. A spring-loaded mounting bracket 206 biases tracking belt 204 against conveyor belt 196. Thus, as conveyor belt 196 moves, tracking belt 204 rotates pulleys 202 as a function of the speed of conveyor belt 196. Preferably, encoder 174 provides the speed signal to electronic control 136 via line 142 as a function of the rotational speed of the respective pulley 202.

Advantageously, encoder 174 having the belt and pulley arrangement 198 of this embodiment provides accurate conveyor speed measurements otherwise unavailable with conventional encoders. Conveyors often range in different widths and styles which makes mounting a feedback mechanism such as encoder 174 difficult. The present embodiment allows a reliable and standard mounting system for rotary encoders, such as encoder 174, to a conveyor. Through use of tracking belt 204, the speed signal generated by encoder 174 averages anomalies in conveyor belt 196 (e.g., bent or damaged links). Further, the length of tracking belt 204 and the diameters of pulleys 202 may be adjusted to accommodate different resolutions.

Figure 7:
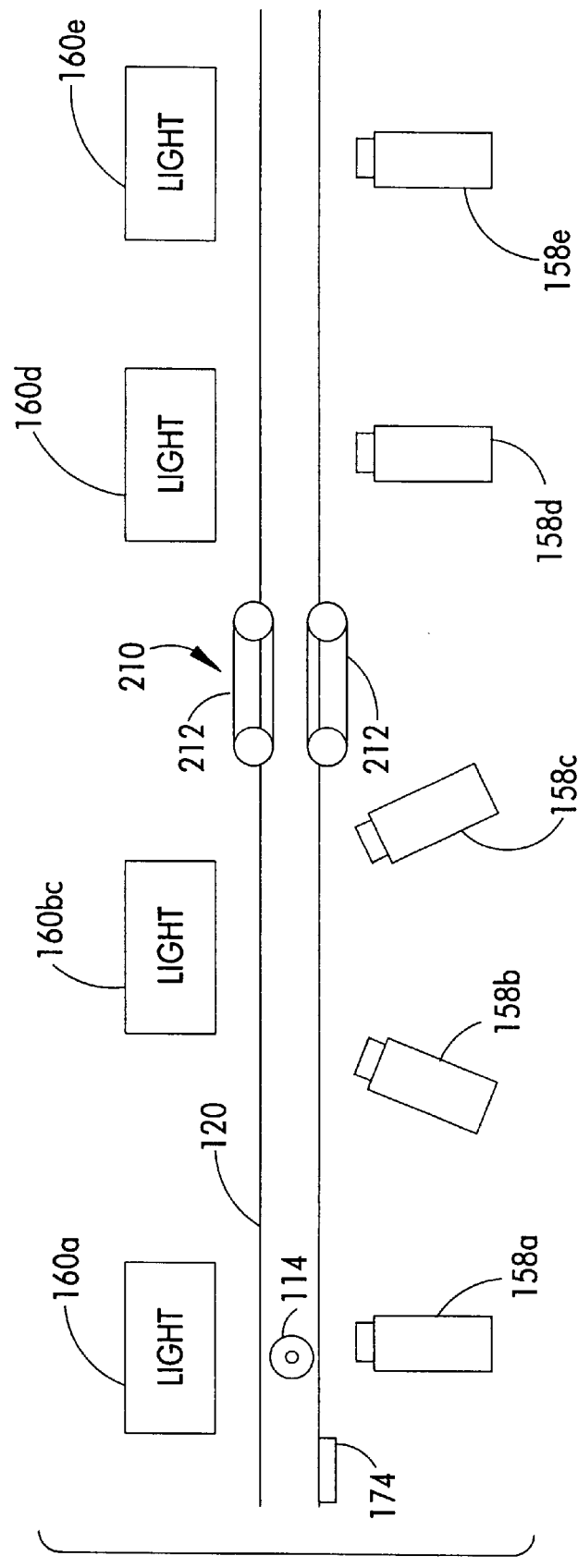
FIG. 7 is a diagrammatic view of another preferred test configuration for the system of FIG. 1.

FIG. 7 provides a diagram illustrating the interior of inspection station 126 according to an alternative embodiment of the invention. In this embodiment, system 110 uses a plurality of cameras 158 for acquiring two-dimensional images of container 114 from different angles. As shown, a preferred electronic/optical imaging configuration for image acquisition includes a first camera 158a and a corresponding lighting assembly 160a positioned across from it. Preferably, the lighting assembly 160a illuminates container 114 with less diffuse, more direct light for causing higher contrast edges in the acquired image. This improves profile inspection for lean, height and other dimensional parameters. As conveyor 120 moves container 114 further through inspection station 126, it passes between two cameras 158b and 158c and a corresponding lighting assembly 160bc. In this embodiment, the cameras 158b, 158c are each positioned at an angle of approximately 67.5° relative to conveyor 120 (i.e., 22.5° relative to perpendicular) for acquiring images of container 114 from different angles. The corresponding lighting assembly 160bc preferably illuminates container 114 with more diffuse light for causing defects such as blisters and like to be more noticeable.

A container transport assembly 210, also referred to as a container rotator or carry belt assembly, is adapted for rotating container 114 as it moves through inspection station 126. For example, the container transport assembly 210 has a pair of belts 212 which engage the side wall of container 114. The belts 212 rotate at different speeds which causes container 114 to rotate by approximately 900 to provide inspection from yet another view. As conveyor 120 moves container 114 through the imaging area between a fourth camera 158d and a fourth lighting assembly 160d, system 110 again acquires a two-dimensional image of container 114. Preferably, the lighting assembly 160d is suited for camera 158d to generate an image of container 114 for defect detection.

Conveyor 120 further transports container 114 through the imaging area between yet another camera 158e and a corresponding lighting assembly 160e. Preferably, the lighting assembly 160e illuminates container 114 with more direct light for enhancing the container's edges for dimensional inspection by system 110.

In the embodiment of FIG. 7, system 110 provides dimensional and defect inspection of container 114 from various views. Moreover, each of the cameras 158a–158e are clocked by encoder 174 so that they are all synchronized with the speed of conveyor 120 to provide an accurate and complete inspection.

In another alternative embodiment, system 110 employs one or more position sensors (not shown) for initiating various stages of the inspection process. For example, top and/or bottom acquisition sensors may be used to detect the position of containers 114 relative to the field of view of camera 158. Camera 158 is responsive to at least one of the acquisition sensors for generating an image of container 114 in its imaging area. In one embodiment, the acquisition sensors used for container detection are photoelectric sensors employing fiber optic cables in a through-beam mode. Preferably, each sensor is located outside the field of view of camera 158. Once container 114 breaks the beam of light provided by the sensor, a high speed counter clocked by encoder 174 starts counting. Preferably, the high speed counter is loaded with an offset value to delay the image acquisition until container 114 is in the field of view of the respective camera 158. This counter can be implemented in hardware or software.

It is further contemplated that a rejector sensor may be used in connection with the rejector 130. In this instance, such a rejector sensor senses the position of containers 114 as they travel out of inspection station 126. If a particular container 114 fails inspection then rejector 130 receives an activating signal a fixed time (or travel distance) after the rejector sensor sensed the presence of that container 114. Preferably, this fixed time is also based on encoder clocking delay to handle varying speeds. Triggered by the activating signal, rejector 130 removes the defective container 114 from the line and deposits it on reject accumulation conveyor 134.

System 110 may also be used in combination with various other inspection systems. For example, as is known in the container manufacturing industry, each container 114 will typically include a pattern identifying the particular mold of container molding apparatus 118 in which it originated. In one type of mold identification, each mold forms markings on the base or heel of container 114 which can be detected to determine the mold in which the container was made (e.g., concentric rings, dots or other markings). Commonly assigned application Ser. No. 08/707,320, the entire disclosure of which is incorporated herein by reference, discloses a preferred mold number reading system for identifying a container's particular mold, or cavity, of origin.

Further, system 110 may include a system for detecting stress-related defects such as improper annealing, embedded foreign objects, variations in glass density, or other anomalies causing stress. Commonly assigned application Ser. No. 08/868,715, the entire disclosure of which is incorporated herein by reference, discloses a preferred system for detecting stress-related defects in containers.

Other systems include a weight station, pushup measuring system, bottom inspection station, and/or optical profile measuring apparatus for further inspection. Commonly owned U.S. Pat. Nos. 4,906,098 and 5,675,516, the entire disclosures of which are incorporated herein by reference, disclose an optical profile measuring apparatus and a pushup sensor, respectively. A suitable companion inspection system for container bottoms is the Superscan II, manufactured by BWI Inex Vision Systems, 13327 U.S. Highway 19 North, Clearwater, Fla. 34624.

Other inspection systems, measuring devices, and improvements for such are disclosed in U.S. Pat. No. 4,082,463, U.S. Pat. No. 4,074,938, and U.S. Pat. No. 4,097,158, the entire disclosures of which are also incorporated herein by reference. U.S. Pat. No. 4,082,463 shows a calibrated optical micrometer and U.S. Pat. No. 4,074,938 shows an optical dimension measuring device employing an elongated, focused beam. U.S. Pat. No. 4,097,158 shows a half-maximum threshold circuit for an optical micrometer.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A system for inspecting a moving container, said system for use with a container handling apparatus that moves the container, said system comprising:
    a speed monitor for generating a signal representative of the speed of the container;
    a light source for illuminating the container;
    a camera for generating a plurality of successive images of portions of the illuminated container, said images each including a plurality of pixels, said pixels each having a value representative of an optical characteristic of the images; and
    an electronic control receiving and responsive to the speed signal for controlling the camera to generate the successive images as a function of the speed of the moving container, said electronic control having an image processor for acquiring a two-dimensional image of the container from the successive images generated by the camera and for processing the two-dimensional image as a function of the pixel values to detect edges in the image for inspecting the container.

2. A system for inspecting a moving container, said system for use with a container handling apparatus that moves the container, said system comprising:
    a speed monitor for generating a signal representative of the speed of the container;
    a light source for illuminating the container;
    a camera for generating a plurality of successive images of portions of the illuminated container, said images each including a plurality of pixels said pixels each having a value representative of an optical characteristic of the images; and
    an electronic control receiving and responsive to the speed signal for controlling the camera to generate the successive images as a function of the speed of the moving container, said electronic control having an image processor for acquiring a two-dimensional image of the container from the successive images generated by the camera and for processing the two-dimensional image as a function of the pixel values to detect edges in the image for inspecting the container, said electronic control also having a memory associated with the image processor for storing the acquired two-dimensional image of the container, said memory defining the size of the two-dimensional image in pixels, and wherein the number of successive images generated by the camera per container is based on the defined size of the two-dimensional image.

3. The system of claim 2 wherein the speed signal comprises a pulse train having a frequency representative of the speed of the container.

4. The system of claim 3 wherein the pulse train has a predetermined number of pulses per unit of container movement, said predetermined number of pulses being a function of the width of the container and the defined size of the two-dimensional image.

5. The system of claim 3 wherein the camera generates the successive images at a frequency corresponding to the frequency of the pulse train.

6. The system of claim 5 each of the successive images corresponds to one of the pulses in the pulse train.

7. The system of claim 1 wherein the electronic control is responsive to the speed signal for increasing light exposure of the camera as the speed of the container increases.

8. The system of claim 1 wherein the container handling apparatus comprises a conveyor having a belt for moving the container and wherein the speed monitor is an encoder assembly for detecting movement of the conveyor belt, said encoder assembly generating the speed signal as a function of the movement of the conveyor belt.

9. The system of claim 8 wherein the encoder assembly comprises a pair of pulleys receiving a tracking belt extending thereacross, said tracking belt engaging the conveyor belt so that movement of the conveyor belt causes a corresponding movement of the tracking belt, and wherein the encoder assembly generates the speed signal based on the movement of the tracking belt.

10. A system for inspecting a moving container, said system for use with a container handling apparatus that moves the container, said system comprising:
    a speed monitor for generating a signal representative of the speed of the container;
    a light source for illuminating the container;
    a first camera for generating a plurality of successive images of portions of the illuminated container, said images each including a plurality of pixels, said pixels each having a value representative of an optical characteristic of the images;
    a second camera for generating another plurality of successive images of portions of the illuminated container, said first and second cameras each having an optical axis, said optical axes being generally perpendicular to an axis of symmetry of the container; and
    an electronic control receiving and responsive to the speed signal for controlling the camera to generate the successive images as a function of the speed of the moving container, said electronic control having an image processor for acquiring a two-dimensional image of the container from the successive images generated by the first camera, for acquiring a two-dimensional image of the container from the other successive images generated by the second camera and for processing the two-dimensional images as a function of the pixel values to detect edges in the images for inspecting the container.

11. The system of claim 10 wherein the optical axes of the first and second cameras are non-parallel relative to each other.

12. The system of claim 10 further comprising a container rotator positioned between the first and second cameras for rotating the container after the first camera generates the successive images of the container and before the second camera generates the other successive images of the container.

13. The system of claim 1 wherein the image processor groups the detected edges as a function of their locations in the two-dimensional image to define objects therein, said defined objects each including one or more pixels, and wherein the electronic control includes a memory storing information regarding defects as a function of the defined objects.

14. The system of claim 1 wherein the image processor groups the detected edges as a function of their locations in the two-dimensional image to define objects therein, said defined objects each including one or more pixels, and wherein the electronic control defines a profile of the container based on the defined objects.

15. The system of claim 1 for use with a lehr for annealing the container before inspection by the system, said system further comprising a feedback circuit for providing information representative of the inspection of the container, said lehr being controlled as a function of the information provided by the feedback circuit for subsequently annealing other containers.

16. The system of claim 1 for use with a container molding apparatus for forming the container before inspection by the system, said system further comprising a feedback circuit for providing information representative of the inspection of the container, said container molding apparatus being controlled as a function of the information provided by the feedback circuit for subsequently forming other containers.

17. An encoder assembly for use with a container handling apparatus for moving containers, said container handling apparatus including a conveyor having a moving belt, said encoder assembly generating a signal representative of the speed of the conveyor belt, said encoder assembly comprising:

a pair of pulleys;

a tracking belt received by the pulleys and extending thereacross, said tracking belt engaging the conveyor belt so that movement of the conveyor belt causes a corresponding movement of the tracking belt; and a rotary encoder engaging one of the pulleys for generating the signal representative of the speed of the conveyor belt as a function of the movement of the tracking belt.

18. The encoder assembly of claim 17 wherein the speed signal comprises a pulse train having a frequency representative of the speed of the conveyor belt.

19. The encoder assembly of claim 18 wherein the pulse train has a predetermined number of pulses per unit of conveyor belt movement, said predetermined number of pulses being a function of the width of the containers and gap therebetween.

20. A system for inspecting a moving container on a conveyor, said conveyor having a belt for moving the container, said system comprising:

an encoder assembly for detecting movement of the conveyor belt and generating a signal representative of the speed of the container as a function of the movement of the conveyor belt;

a light source adjacent the conveyor for illuminating the container;

a camera adjacent the conveyor for generating a plurality of successive images of portions of the illuminated container, said images each including a plurality of pixels, said pixels each having a value representative of an optical characteristic of the images; and an electronic control receiving and responsive to the speed signal for controlling the camera to generate the successive images as a function of the speed of the moving container, said electronic control having an image processor for acquiring a two-dimensional image of the container from the successive images generated by the camera and for processing the two-dimensional image as a function of the pixel values to detect edges in the image for inspecting the container.

21. A method of inspecting a moving container on a conveyor, said conveyor having a belt for moving the container, said method comprising the steps of:

positioning an encoder assembly on the conveyor belt for detecting movement thereof;

generating a signal with the encoder assembly representative of the speed of the container as a function of the movement of the conveyor belt;

illuminating the container on the conveyor belt;

controlling a camera to generate a plurality of successive images of portions of the illuminated container as a function of the speed of the moving container, said images each including a plurality of pixels, said pixels each having a value representative of an optical characteristic of the images;

acquiring a two-dimensional image of the container in a memory from the successive images generated by the camera; and processing the two-dimensional image as a function of the pixel values to detect edges in the image for inspecting the container.

22. The method of claim 21 further comprising the steps of defining the size of the two-dimensional image in pixels based on the size of the memory and defining the number of successive images generated by the camera per container based on the defined size of the two-dimensional image.

23. The method of claim 22 wherein the speed signal comprises a pulse train having a frequency representative of the speed of the container and wherein the step of controlling the camera includes generating the successive images at a frequency corresponding to the frequency of the pulse train.

24. The method of claim 23 wherein each successive image generated by the camera corresponds to one of the pulses in the pulse train.

25. The method of claim 22 wherein the step of generating the speed signal includes generating the pulse train so that a predetermined number of pulses occur per unit of conveyor belt movement, said predetermined number of pulses being a function of the width of the container and the defined size of the two-dimensional image.

26. The method of claim 21 wherein the step of controlling the camera includes increasing light exposure to the camera as the speed of the container increases.

27. A method of inspecting a moving container on a conveyor said conveyor having a belt for moving the container, said method comprising the steps of:

positioning an encoder assembly on the conveyor belt for detecting movement thereof;

generating a signal with the encoder assembly representative of the speed of the container as a function of the movement of the conveyor belt;

illuminating the container on the conveyor belt;

controlling a camera to generate a plurality of successive images of portions of the illuminated container as a function of the speed of the moving container, said images each including a plurality of pixels, said pixels each having a value representative of an optical characteristic of the images;

controlling another camera to generate a plurality of successive images of portions of the illuminated container as a function of the speed of the moving container;

acquiring a two-dimensional image of the container in a memory from the successive images generated by the camera;

acquiring another two-dimensional image of the container from the successive images generated by the other camera; and processing the two-dimensional images as a function of the pixel values to detect edges in the images for inspecting the container.

28. The method of claim 21 for use with a lehr for annealing the container before inspection, said method further comprising the steps of providing feedback information representative of the inspection of the container and controlling the lehr as a function of the information for subsequently annealing other containers.

29. The method of claim 21 for use with a container molding apparatus for forming the container before inspection, said method further comprising the steps of providing feedback information representative of the inspection of the container and controlling the container molding apparatus as a function of the information for subsequently forming other containers.

* * * * *